(12) United States Patent
Chertov et al.

(10) Patent No.: US 11,070,418 B1
(45) Date of Patent: Jul. 20, 2021

(54) SYSTEM AND METHOD FOR MANAGING DISTRIBUTION OF STATE INFORMATION

(71) Applicant: Arista Networks, Inc., Santa Clara, CA (US)

(72) Inventors: Roman Olegovich Chertov, San Jose, CA (US); Adam James Sweeney, Santa Clara, CA (US); Hugh W. Holbrook, Palo Alto, CA (US); Karthik Shyam Krishnan Subraveti, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/835,780

(22) Filed: Mar. 31, 2020

(51) Int. Cl.
*H04L 12/24* (2006.01)
*H04L 12/18* (2006.01)
*H04L 29/08* (2006.01)

(52) U.S. Cl.
CPC ............ *H04L 41/046* (2013.01); *H04L 12/18* (2013.01); *H04L 67/10* (2013.01); *H04L 67/141* (2013.01)

(58) Field of Classification Search
CPC ....... H04L 41/046; H04L 12/18; H04L 67/10; H04L 67/141
See application file for complete search history.

(56) References Cited

U.S. PATENT DOCUMENTS

| | | | |
|---|---|---|---|
| 6,065,039 A * | 5/2000 | Paciorek | G06F 9/4862 709/202 |
| 9,571,656 B2 * | 2/2017 | Barinov | H04M 3/51 |
| 2003/0217096 A1 * | 11/2003 | McKelvie | H04L 51/04 709/202 |
| 2007/0266075 A1 * | 11/2007 | Jachner | H04L 67/14 709/203 |
| 2014/0126711 A1 * | 5/2014 | Barinov | H04M 3/5175 379/265.02 |
| 2020/0128107 A1 * | 4/2020 | Clark | H04L 67/42 |
| 2020/0128108 A1 * | 4/2020 | Clark | H04L 67/14 |

\* cited by examiner

*Primary Examiner* — Azizul Choudhury
(74) *Attorney, Agent, or Firm* — Chamberlain, Hrdlicka, White, Williams & Aughtry

(57) ABSTRACT

A network device includes a storage and a message bus. The storage stores subscription information. The message bus distributes state information associated with a first agent to at least two agents based on the subscription information. The message bus is distinct from the first agent. The state information is stored in a data structure exclusively managed by the first agent. The message bus, after distributing the state information, makes a determination that a connection to one of the at least two agents has been closed; and performs, based on the determination, an action set to prevent attempts to distribute future state information to the one of the at least two agents.

20 Claims, 12 Drawing Sheets

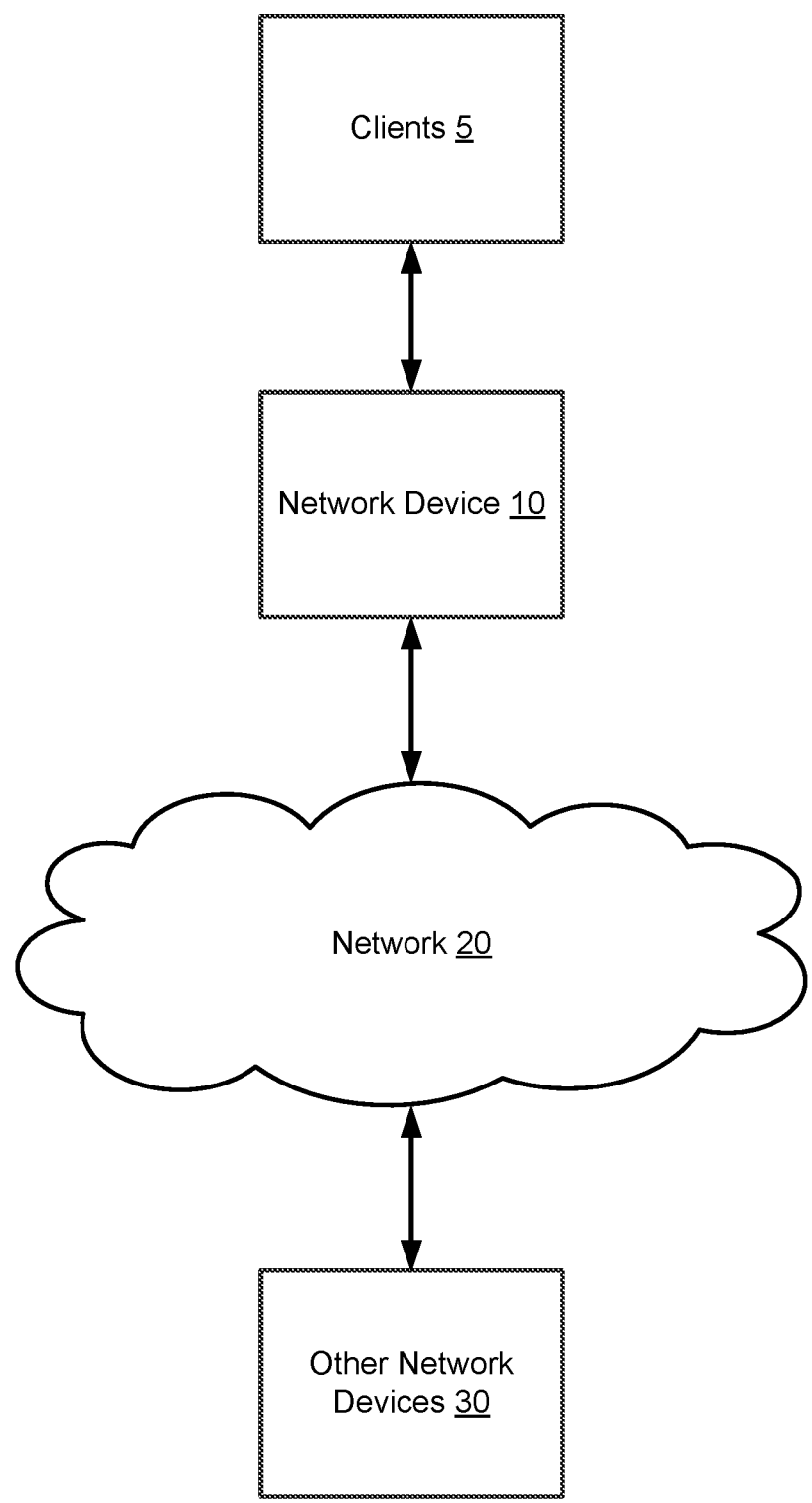
FIG. 1.1

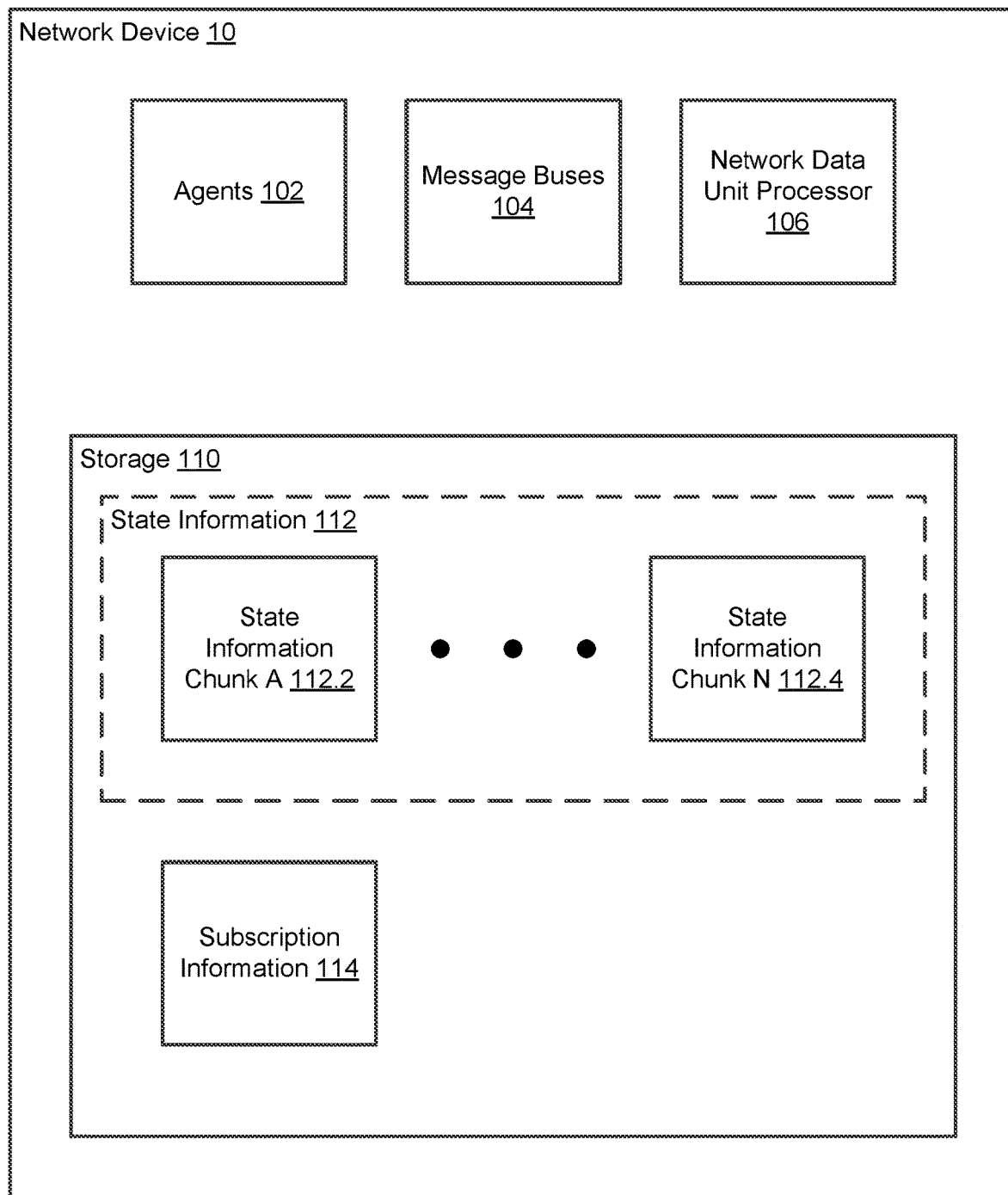
FIG. 1.2

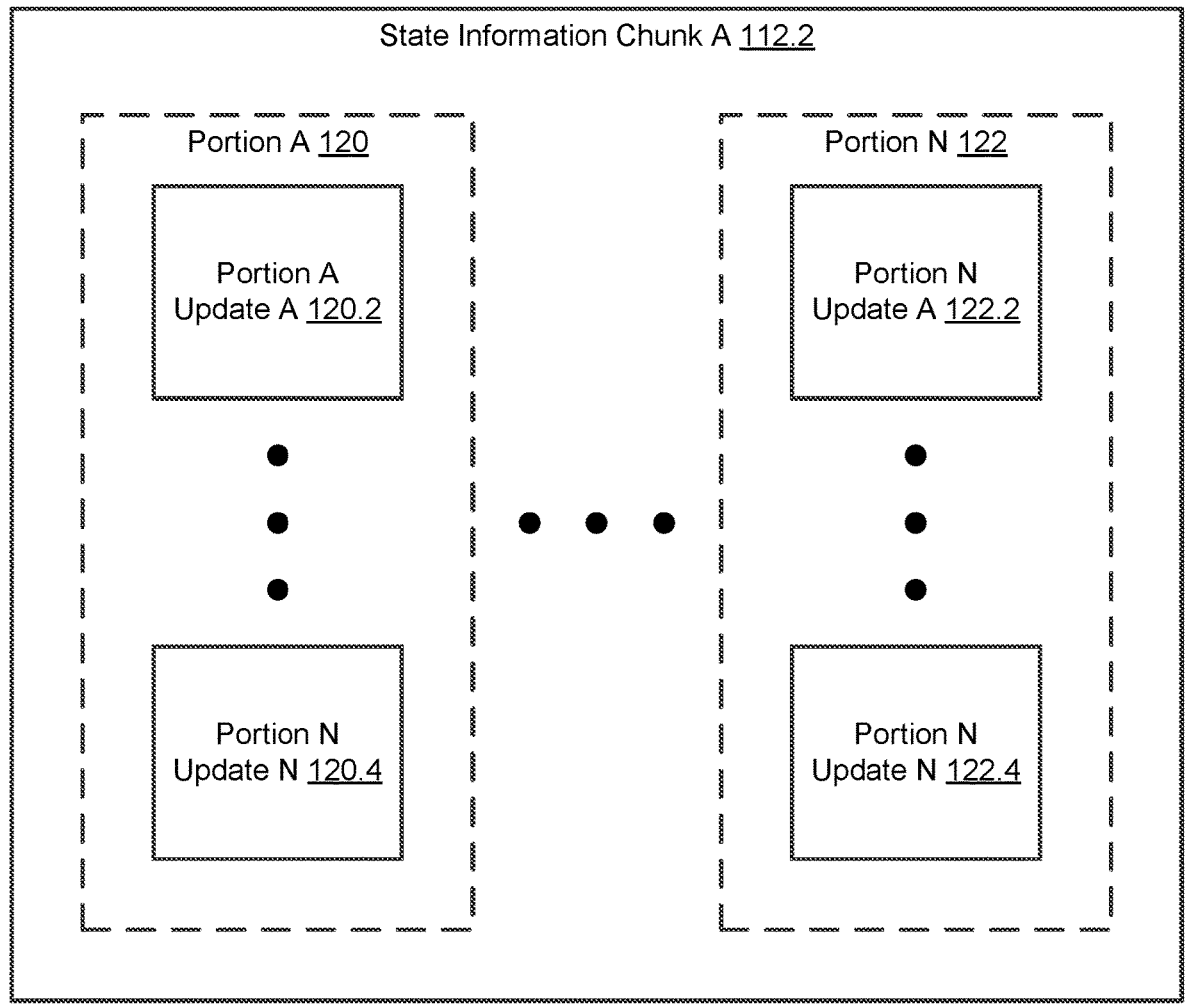
FIG. 1.3

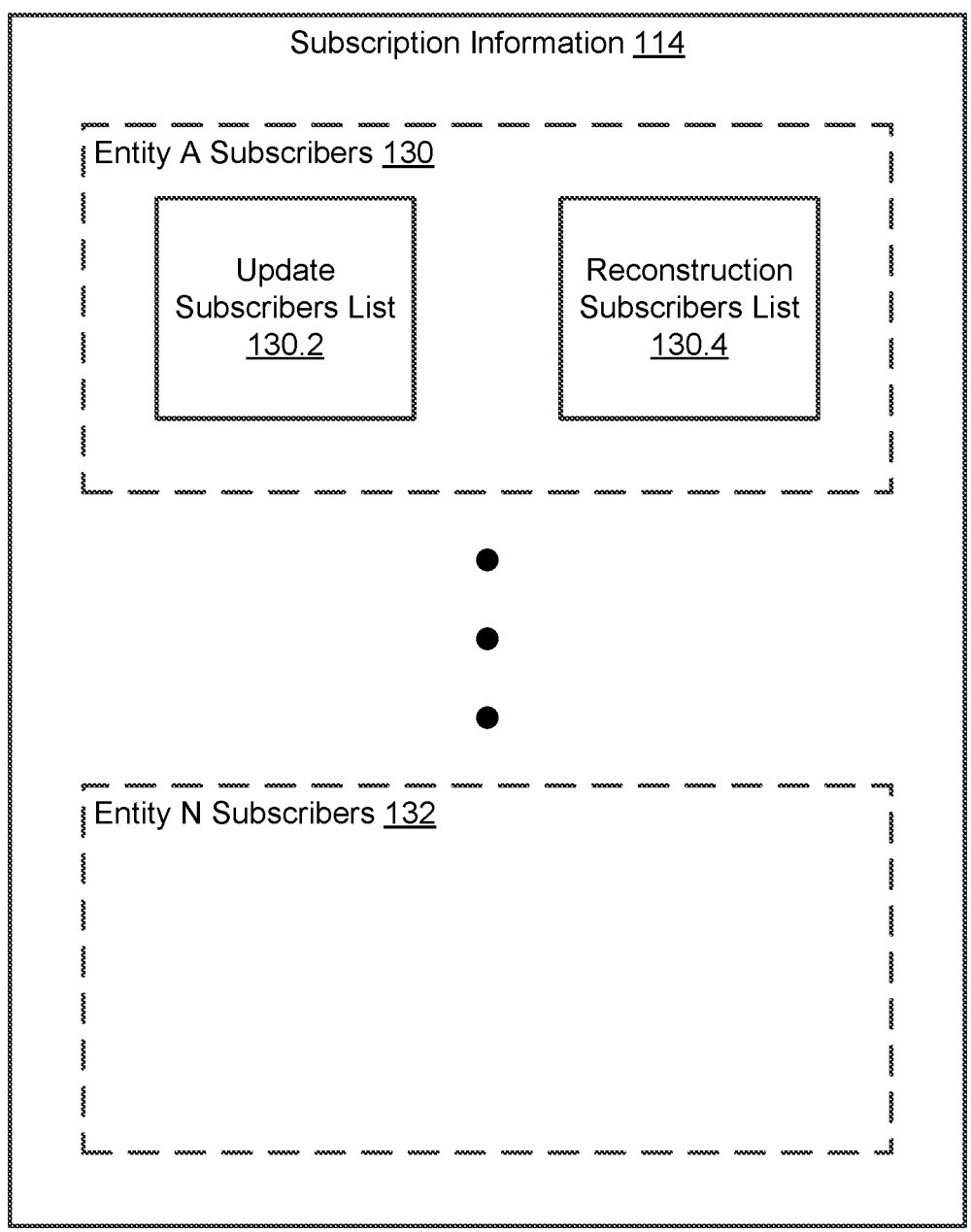
FIG. 1.4

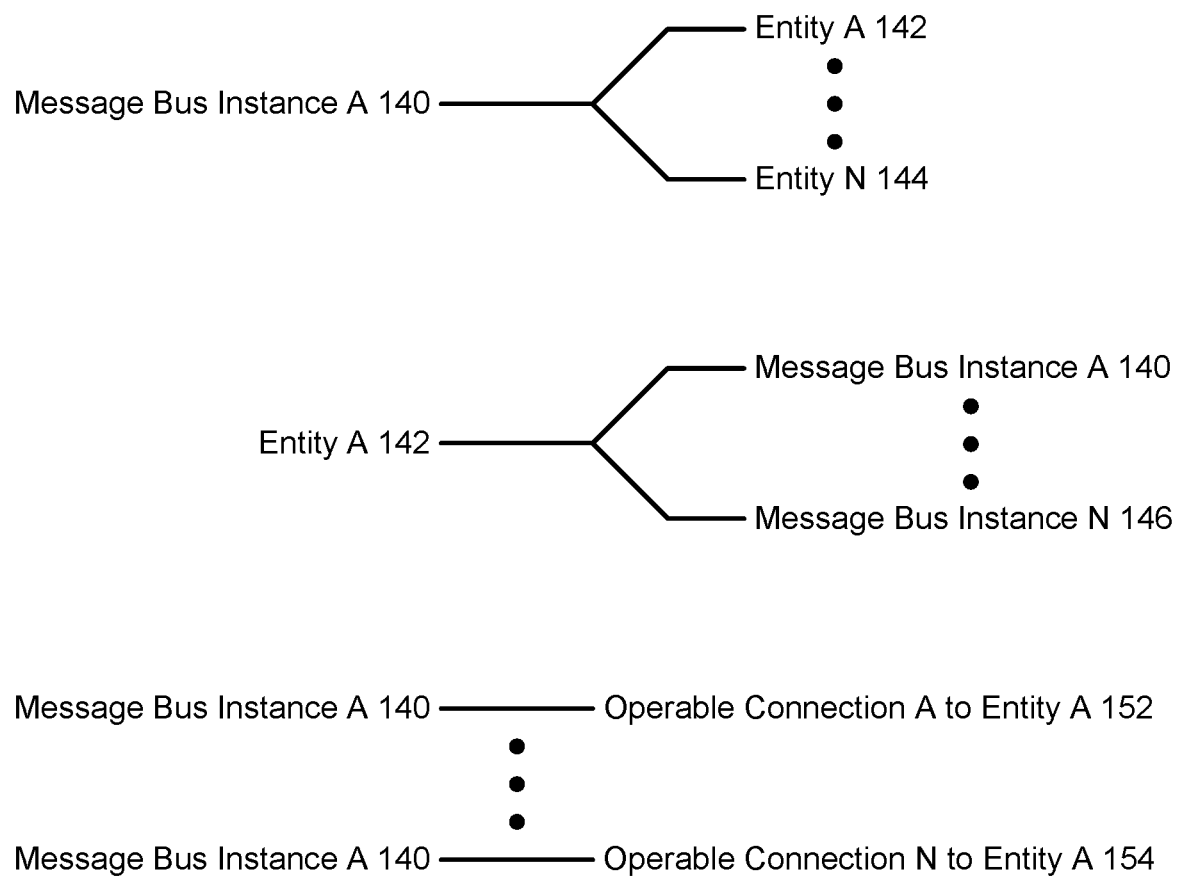
FIG. 1.5

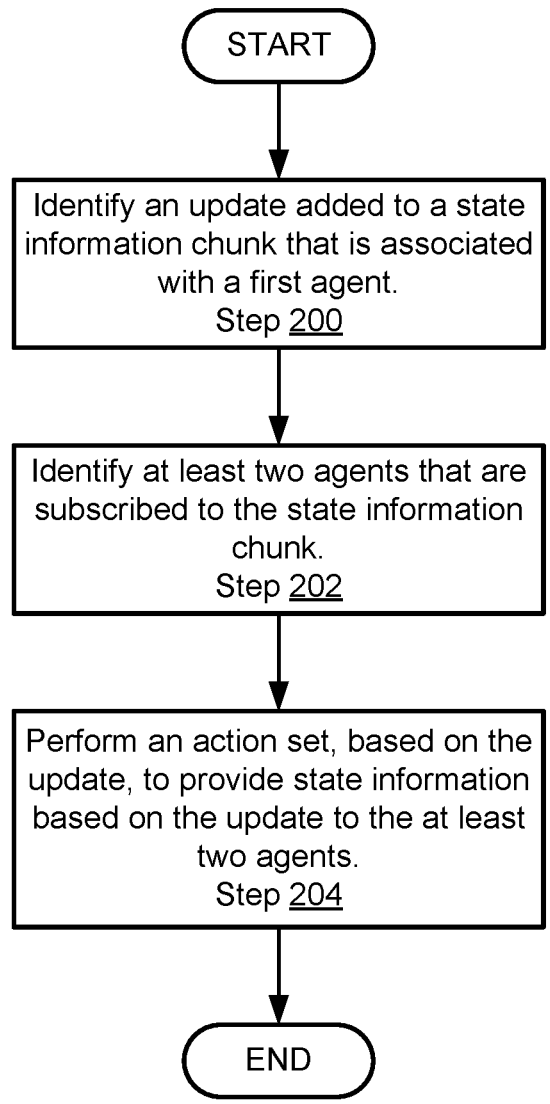
FIG. 2.1

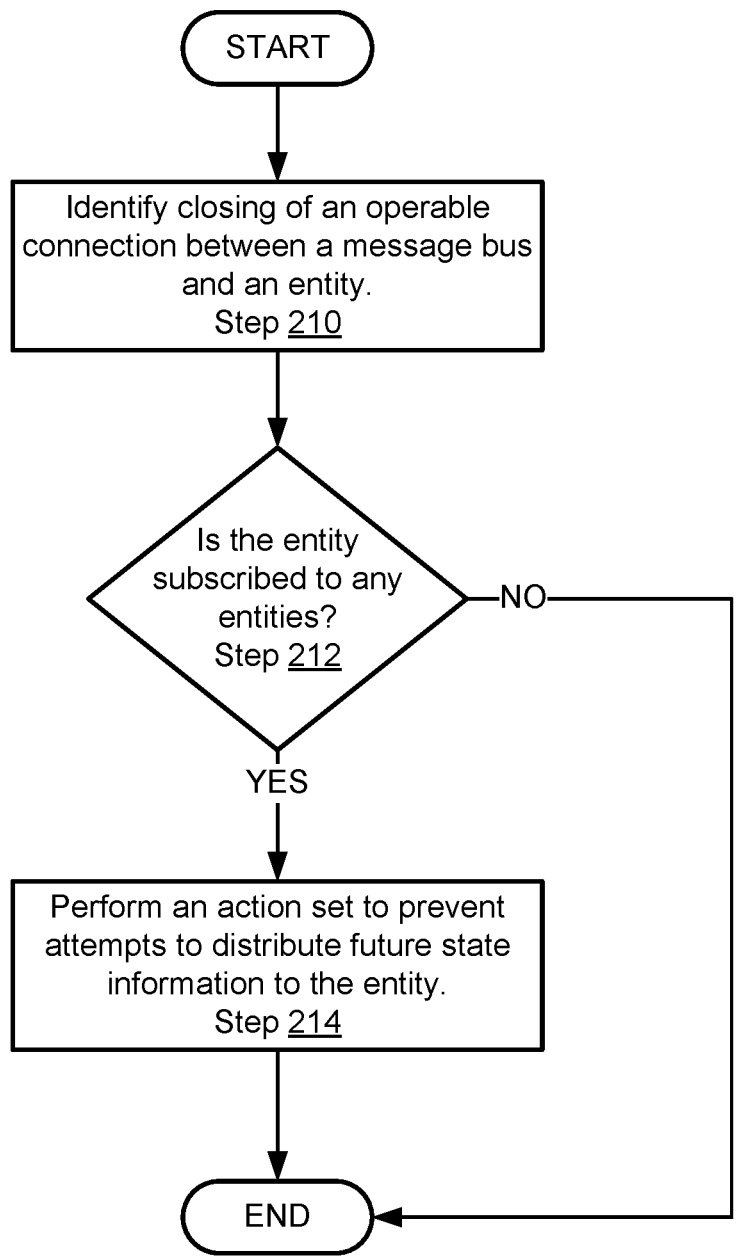
FIG. 2.2

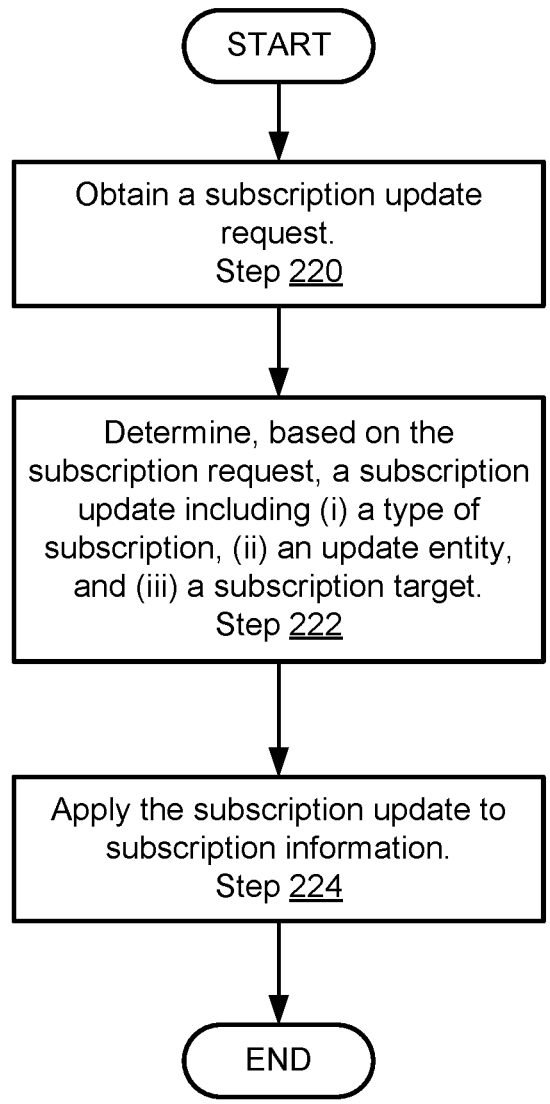
FIG. 2.3

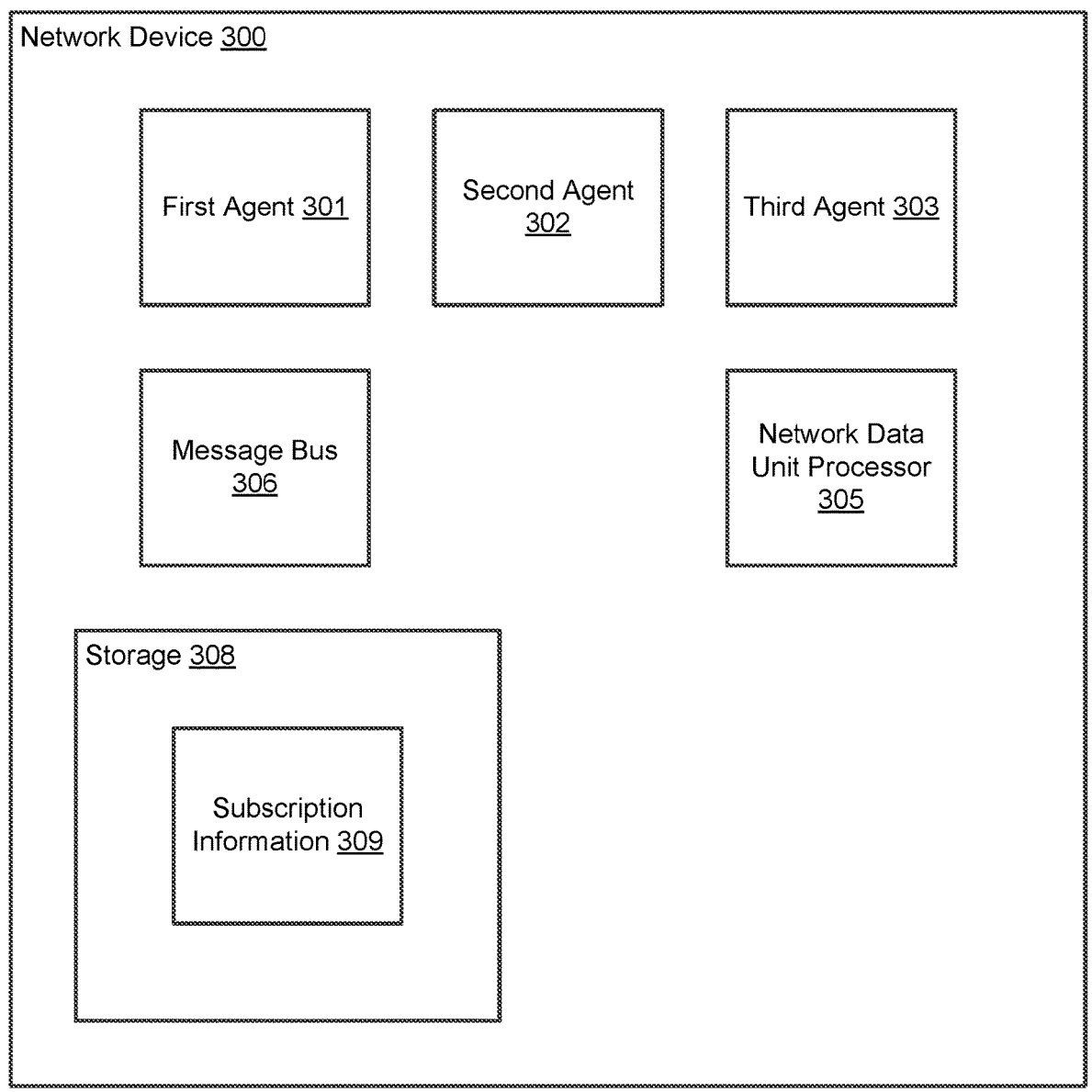
FIG. 3.1

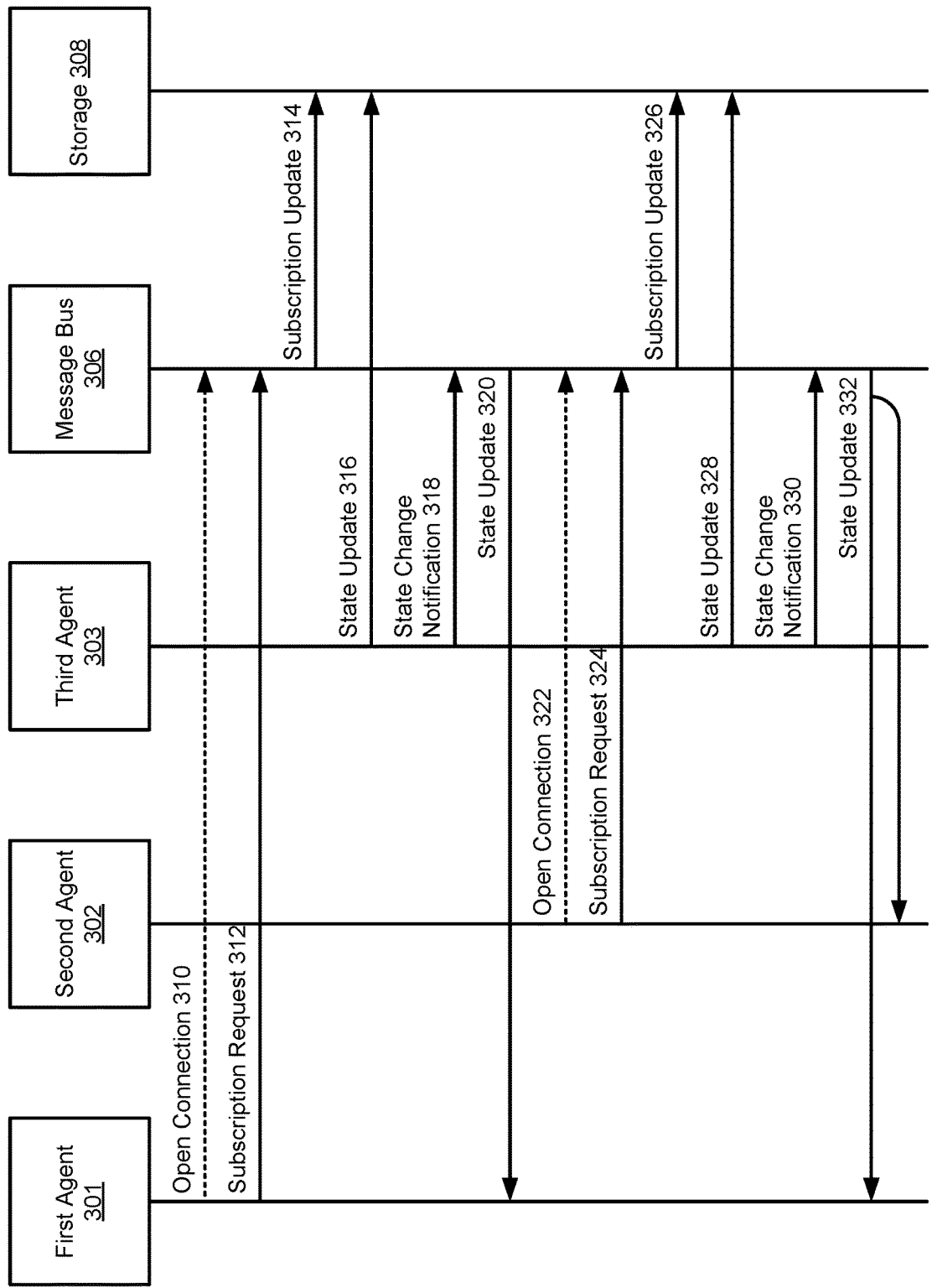
FIG. 3.2

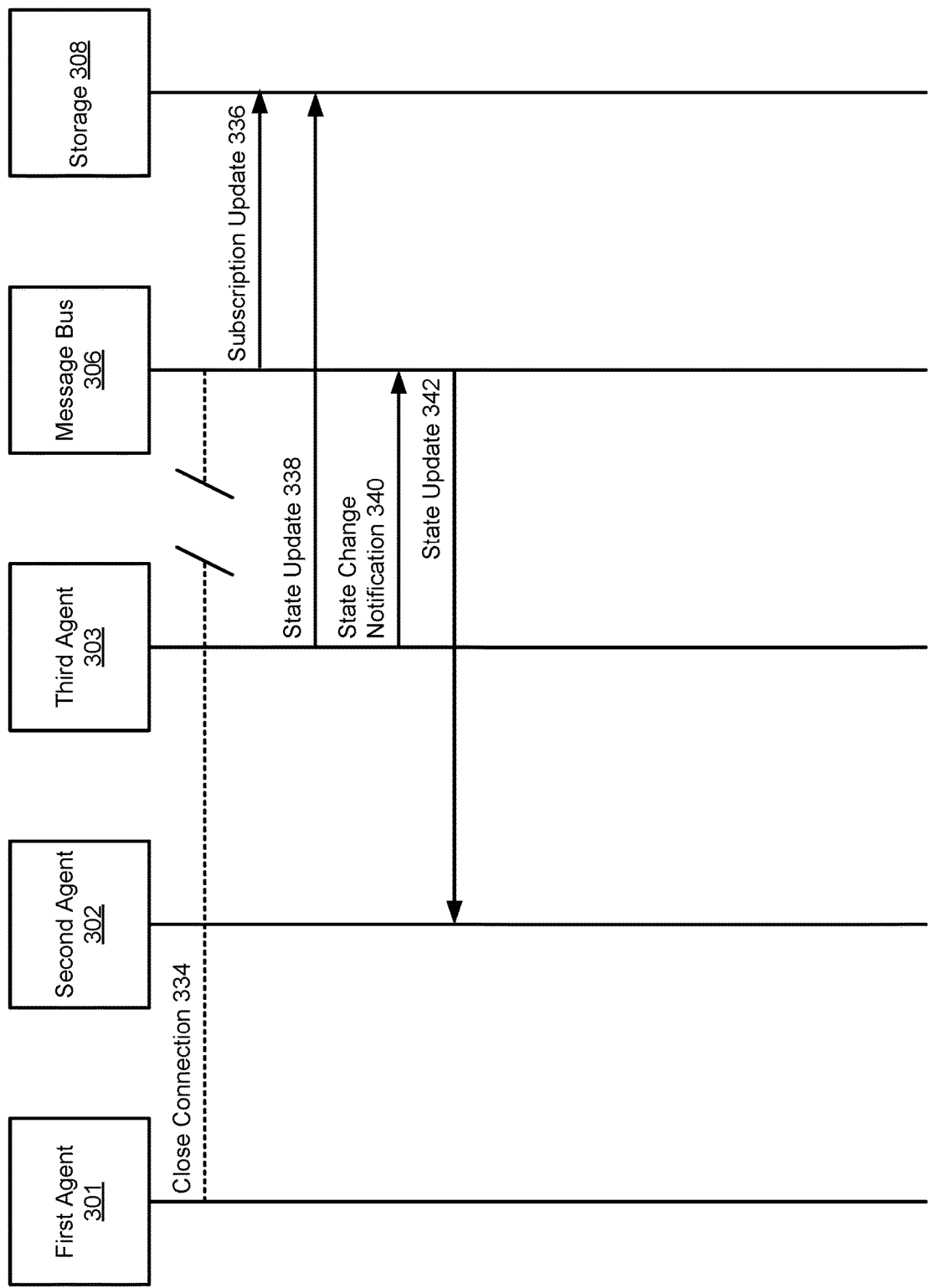
FIG. 3.3

US 11,070,418 B1

SYSTEM AND METHOD FOR MANAGING DISTRIBUTION OF STATE INFORMATION

BACKGROUND

Computing devices may host logical entities such as, for example, instances of processes. The behavior of logical entities may change over time. For example, during some periods of time the logical entities may perform actions associated with a first behavior while during other periods of time the logical entities may perform actions associated with a second behavior. The different behaviors of logical entities may be dictated by the corresponding computer code that when executed by a processor gives rise to the logical entities.

SUMMARY

In one aspect, a network device in accordance with one or more embodiments disclosed herein includes a storage and a message bus. The storage stores subscription information. The message bus distributes state information associated with a first agent to at least two agents based on the subscription information. The message bus is distinct from the first agent. The state information is stored in a data structure exclusively managed by the first agent. The message bus, after distributing the state information, makes a determination that a connection to one of the at least two agents has been closed and performs, based on the determination, an action set to prevent attempts to distribute future state information to the one of the at least two agents.

In one aspect, a method in accordance with one or more embodiments disclosed herein includes distributing, via a message bus, state information associated with a first agent, distinct from the message bus, to at least two agents based on subscription information, the state information is stored in a data structure exclusively managed by the first agent; after distributing the state information, making a determination that a connection to one of the at least two agents has been closed; and performing, based on the determination, an action set to prevent attempts to distribute future state information to the one of the at least two agents.

In one aspect, a non-transitory computer readable medium in accordance with one or more embodiments disclosed herein includes computer readable program code, which when executed by a computer processor enables the computer processor to perform a method. The method includes distributing, via a message bus, state information associated with a first agent, distinct from the message bus, to at least two agents based on subscription information, the state information is stored in a data structure exclusively managed by the first agent; after distributing the state information, making a determination that a connection to one of the at least two agents has been closed; and performing, based on the determination, an action set to prevent attempts to distribute future state information to the one of the at least two agents.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 1.3 shows a diagram of a state information chunk in accordance with one or more embodiments disclosed herein.

FIG. 1.4 shows a diagram of subscription information in accordance with one or more embodiments disclosed herein.

FIG. 1.5 shows a diagram of relationships in accordance with one or more embodiments disclosed herein.

FIG. 2.1 shows a flowchart of a method of distributing state information in accordance with one or more embodiments disclosed herein.

FIG. 2.2 shows a flowchart of a first method of maintaining subscription information in accordance with one or more embodiments disclosed herein.

FIG. 2.3 shows a flowchart of a second method of maintaining subscription information in accordance with one or more embodiments disclosed herein.

FIG. 3.1 shows a non-limiting example of a system.

FIG. 3.2 shows a diagram of interactions and actions performed by components of the system of FIG. 3.1 over time.

FIG. 3.3 shows a continuation of the diagram of FIG. 3.2.

DETAILED DESCRIPTION

Figure 4:
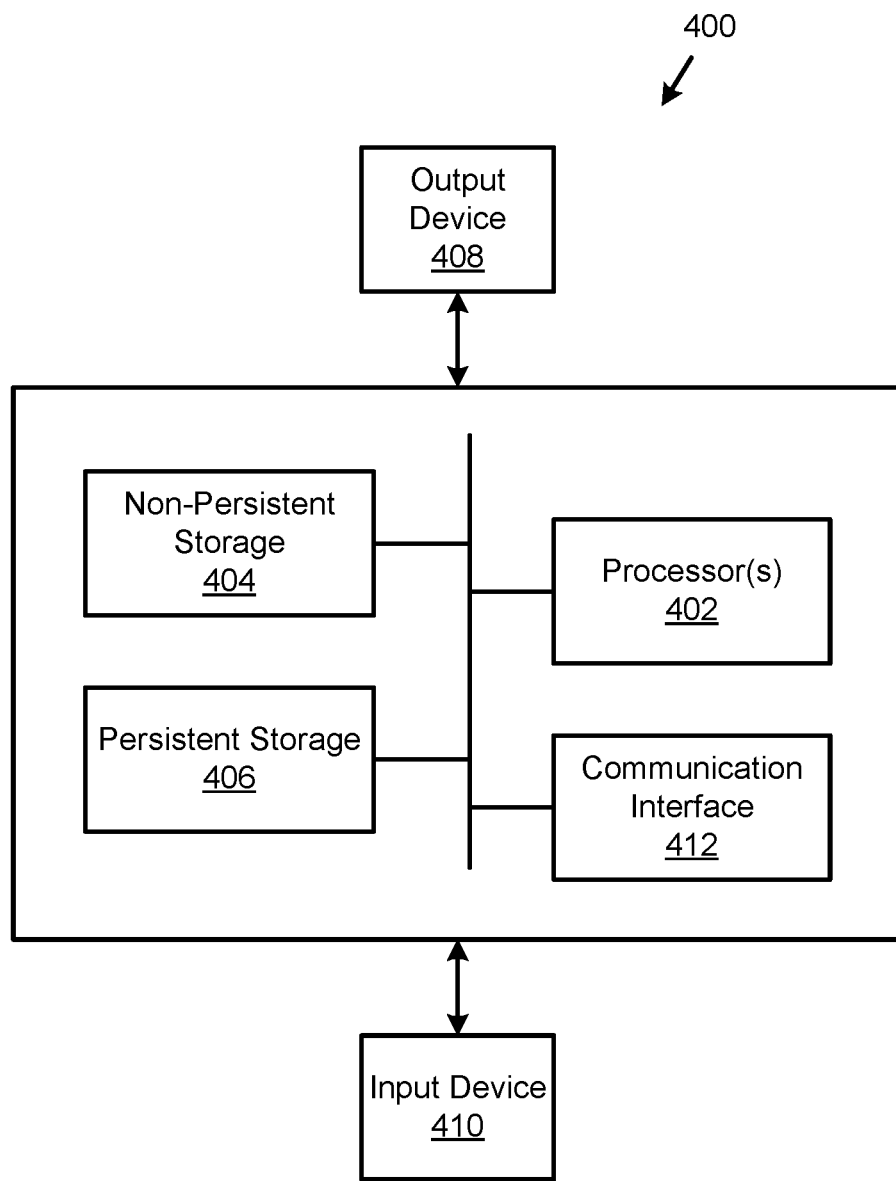
FIG. 4 shows a diagram of a computing device in accordance with one or more embodiments disclosed herein.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In systems that utilize computing devices, the computing devices may host any number of applications (e.g., may be referred to as agents). The applications hosted by the computers may perform any number of functionalities. For example, the applications may obtain data, process the data to obtain new data, and communicate with other devices.

When applications provide their respective functionalities, the applications may provide their functionalities based on how other applications are providing their functionalities. In other words, the manner in which an application operates may be dependent upon how any number of other applications are operating. The manner in which an application is operating may be referred to as the operating state of the application.

To modify the manner of operation based on the operating states of other entities, the applications (and/or other types of entities) may need to obtain information regarding the states of other entities (e.g., state information). In other words, state information may need to be distributed to the applications.

However, as the number of applications (and/or other entities) desiring state information increases, the computational overhead for distributing state information increases. For example, to distribute state information, information regarding the respective desires of each entity must be maintained. Maintaining information regarding the respective desires of each entity may consume processing resources (e.g., processing requests from the applications for state information), storage resources, communication resources, etc. Consequently, maintaining and distributing state information may limit the ability of computing devices to provide their other functionalities (e.g., providing other computer implemented services) by limiting the quantity of available computing resources.

Embodiments of the invention may provide a system for maintaining and/or distributing state information that infers, rather than directly determines, whether applications and/or other entities desire access to state information based on the behaviors of the applications and/or other entities. By doing so, the system may consume fewer computing resources for maintaining and/or distributing state information by avoiding computing resource consumption for directly determining the desires of the applications.

For example, to directly determine whether an application desires state information, the system may need to obtain information from the application (e.g., send a request to the application and receiving information in response to the request) and process the information to make a direct determination. The obtained and processed information may only be usable for the single purpose of ascertaining the desires of the application.

In contrast, by inferring the desires of the application, rather than making a direct determination, the system may only need to process information obtained from the application for purposes other than ascertaining the desires of the application. Consequently, the computational resource cost of obtaining information that may only be used for ascertaining the desires of the application may be avoided.

To infer the desires of the application, the system may utilize network connectivity information (e.g., opening/closing of operable connections) provided by the application to infer the state information desires of the client. By doing so, the desires of application with respect to being provided state information may be determined without incurring the computational overhead of requesting, obtaining, and/or processing messages from the application which explicitly include the preferences of the application regarding being provided state information. By doing so, the availability of computational resources in the system may be increased. Consequently, the system may be able to provide its other functionalities more quickly or otherwise provide an improved user experience.

In the text that follows, a description of components of a system in accordance with embodiments of the invention is provided with respect to FIGS. 1.1-1.2 followed by a description of data structures with respect to FIGS. 1.3-1.4 that may be utilized by the system of FIG. 1.1. After the description of the data structure, a description of methods that may be performed by the system of FIG. 1.1 is provided with respect to FIGS. 2.1-2.3. An example of a series of actions that may be performed by the system of FIG. 1.1 is provided with respect to FIGS. 3.1-3.3. Lastly, a description of a computing device that may be used to implement the system of FIG. 1.1 is provided with respect to FIG. 4.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

FIG. 1.1 shows a diagram of an example system in accordance with one or more embodiments described herein. The system may include clients (5) that utilize services provided by a network device (10). The services provided by the network device (10) may include, for example, network data unit forwarding services. By forwarding network data units, the network device (10) may enable the clients (5) to communicate with other devices (e.g., network 20, other network devices (30)).

For example, the network device (10) may be operably connected to other network devices (30) via a network (20). The network device (10), network (20), and other network devices (30) may cooperate (e.g., all implement one or more common network communication protocols) to forward network data units to each other. The network device (10) may also forward network data units to the clients (5). The network data units may include messages destined for the various devices of the example system.

Forwarding network data units may consume computing resources of the devices of FIG. 1.1. For example, when a network data unit is sent from the clients (5) to the network device (10), the network device (10) may need to perform one or more actions to determine to which device (e.g., a device of the network (20) or another device not illustrated in FIG. 1.1) to forward the network data unit.

In addition to forwarding network data units, the network device (10) may also perform other functions. For example, the network device (10) may update its network data unit forwarding functionality based on information obtained from a variety of sources. To update its network data unit forwarding functionality, the network device (10) may perform actions (e.g., processing information regarding a structure of the topology of the example system) to maintain information (e.g., forwarding information) which the network device (10) uses to decide to which devices to forward network data units.

To provide the aforementioned services, any of the devices illustrated in FIG. 1.1 may host agents. Agents may be logical entities that provide all, or a portion, of the aforementioned services and/or other types of services.

When the agents are providing their respective functionalities, the agents may utilize state information regarding the states of other agents. For example, information regarding a state of another agent may be used by an agent to determine a course of action to take or otherwise modify its behavior. The state of an agent may indicate the past, current, and/or future behavior of the agent.

A network device in accordance with embodiments disclosed herein may enable state information for any number of agents to be distributed to agents (and/or other entities) hosted by the network device and/or other devices by providing state information distribution services. State information distribution services may include (i) obtaining state information from one or more entities, (ii) determining entities that are interested in the state information, and (iii) providing the obtained state information to one or more identified entities. The state information distribution services may be implemented in a disaggregated, data corruption tolerant, distributed, and/or asynchronous manner. By doing so, embodiments disclosed herein may provide a network device that is able to distribute state information in an environment in which data corruption may occur.

Additionally, the state information distributions services may be implemented in a computationally efficient manner. To implement the state information distribution services in a computationally efficient manner, components of the system may make assumptions regarding whether entities desire access to state information based on the actions of the entities. For example, rather than requesting that the entities provide information regarding their state information preferences, the components of the system may utilize actions performed by the entities to determine the state information preferences of the entities. By doing so, the components of the system may proactively reduce the amount of state information being distributed within the system thereby reducing the quantity of computing resources consumed for state information distribution purposes.

While each of the devices of FIG. 1.1 is illustrated as being operably connected to other devices using lines having double ended arrows as ends, such lines may represent any number of physical connections over which the network data units may be forwarded. For example, the line between the network device (10) and the network (20) may represent ten physical connections between the network device (10) and devices of the network (20). In such a scenario, network data units received by the network device (10) may be forwarded towards the network (20) and/or the other network devices (30) using any of the ten physical connections.

In another example, the line between the network device (10) and the network (20) may represent a connection between the network device (10) and an other device (not shown) which is, in turn, physically connected to a device of the network (20). In such a scenario, network data units received by the network device (10) may be forwarded towards the network (20) and/or other network devices (30) using the connection to the other device (not shown) and the connection between the other device and the device of the network (20).

Any of the components of FIG. 1.1 may be operably connected by any combination and/or number of wired and/or wireless connections.

As discussed above, the system of FIG. 1.1 may include network devices that may provide network data unit forwarding services and/or state information distribution services. Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.3. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices to provide their respective functionalities. The devices of FIG. 1.1 may be implemented using other types of logical devices without departing from the embodiments disclosed herein.

For example, the functionality of the network device (10) may be performed by a virtual machine, or another type of logical entity, that provides the functionality of the network device (10) discussed throughout this application.

The devices of FIG. 1.1 may be implemented using general computing devices such as, for example, servers. In such a scenario, the functionality of the network device (10) such as, for example, network data unit forwarding functionality may be performed by computing devices that do not include specialized hardware for the specialized functionality of the network device (10). The specialized functionality may be, for example, implemented in software.

To further clarify aspects of network devices, a diagram of a network device (10) is provided in FIG. 1.2. Any of the network devices of FIG. 1.1 may be may be similar to the network devices illustrated in FIG. 1.2.

FIG. 1.2 shows a diagram of a network device (10) in accordance with one or more embodiments described herein. The network device (10) may provide any number of functionalities (e.g., services), including network data unit forwarding functionality and state information distribution functionality.

To provide the above noted functionality of the network device (10), the network device (10) may include agents (102), message buses (104), a network data unit processor (106), and storage (110). Each of these components of the network device (10) is discussed below.

In one or more embodiments disclosed herein, one or more of the agents (102) is implemented using a hardware device including circuitry. The agents (102) may include, for example, a digital signal processor, a field programmable gate array, and/or an application specific integrated circuit.

The circuitry of the aforementioned devices may be adapted to provide the functionality of the agents (102). The agents (102) may be implemented using other types of hardware devices without departing from the embodiments disclosed herein.

In one or more embodiments disclosed herein, one or more of the agents (102) is implemented using computing code stored on a persistent storage that when executed by a processor of the network device (10) performs the functionality of the agents (102). The processor may be a hardware processor including circuitry such as, for example, a central processing unit or a microcontroller. The processor may be other types of hardware devices for processing digital information without departing from the embodiments disclosed herein.

In one or more embodiments disclosed herein, the agents (102) provide computer implemented services. The computer implemented services may be any type and/or quantity of computer implemented service. For example, the computer implemented services provided by the agents (102) may include (i) obtaining information regarding a network environment in which the network device (10) resides, (ii) processing the obtained information to determine how to forward network data units, and/or (iii) providing other types of services that enable the network device (10) to provide any type and/or quantity of services.

When providing computer implemented services, any of the agents (102) may modify the manner in which computer implemented services are performed based on the state of other entities (e.g., other agents hosted by the network device (10), other network devices, or other types of devices). In other words, the behavior of the agents (102) may depend on the state of other entities.

To modify the behaviors of the agents (102) based on the states of other entities, the agents (102) may need to be able to determine the state of other entities. In other words, one or more of the agents (102) may need access to state information regarding the states of one or more other entities to provide their own functionalities.

To enable the agents (102) to determine the state of other entities, embodiments disclosed herein may provide a system for distributing state information. The method may be implemented in a disaggregated, data corruption tolerant, distributed, and/or asynchronous manner. Specifically, one or more of the agents (102) may interact with one or more of the message buses (104) to (i) generate a distributed data structure that includes state information regarding the states of the one or more agents (102), (ii) update the distributed data structure based on changes to the states of the one or more agents (102), (iii) determine which entities desire to access state information, and/or (iv) notify the entities that desire access to the state information of updates made to the distributed data structure. The notifications provided to the entities that desire access to the state information may be provided with copies of the state information or other types of data based on the state information. By doing so, entities that desire access to state information of an agent may be provided the information in a computationally efficient manner.

For example, the notifications regarding the updates may only include differential state information (i.e., information reflecting changes to a state of an entity rather than the current state) rather than information reflecting the current state of an agent. Consequently, the notifications may include smaller amounts of data which reduce the computational cost (e.g., processor cycles, memory capacity, storage capacity, network bandwidth, etc.) of notifying other entities of the current state of an agent. However, differential state information may not be able to be used in isolation.

For example, a piece of differential state information may specify how a state changed but not how a state was before or after the change. Rather, the differential state may need to be used in combination with a known state of an entity to determine a new state of the entity. So long as an entity has access to all of the modifications of the state of a second entity over time, the entity may be able to reconstruct the state of the second entity by sequentially applying modification to a base known state of the second entity.

Additionally, embodiments disclosed herein may provide a method for ascertaining which entities desire access to state information without directly requesting such information from the entities. As noted above, the actions of the entities may be used to infer whether the entities desire access to be provided state information.

To do so, the method may include (i) monitoring operable connections between the entities and message buses, (ii) identifying, based on the monitor, when the entities terminate connections between the entities and the message buses, and/or (iii) inferring that the entities do not desire access to state information from one or more entities based on the identified terminations of operable connections. By doing so, a system in accordance with embodiments disclosed herein may inferentially determine when entities do not desire access to state information from specific entities. Consequently, the system may automatically stop supply state information to the aforementioned entities without incurring the computational overhead of sending requests to the entities, processing the requests by the entities, receiving responses from the entities, and processing the responses to ascertain whether the entities desire access to state information from specific entities.

To provide the above noted functionality of the agents (102) and/or the message buses (104), the agents (102) and/or the message buses (104) may perform all, or a portion, of the methods illustrated in FIGS. 2.1-2.3. When providing the above noted functionalities, the agents (102) and/or the message buses (104) may utilize data structures stored in the storage (110) (and/or other locations not illustrated in FIG. 1.2). Utilizing the data structures may include, for example, reading portions of the data structures, modifying portions of the data structures, and/or adding additional data to the data structures.

In one or more embodiments disclosed herein, one or more of the message buses (104) is implemented using a hardware device including circuitry. The message buses (104) may include, for example, a digital signal processor, a field programmable gate array, and/or an application specific integrated circuit. The circuitry of the aforementioned devices may be adapted to provide the functionality of the message buses (104). The message buses (104) may be implemented using other types of hardware devices without departing from the embodiments disclosed herein.

In one or more embodiments disclosed herein, one or more of the message buses (104) is implemented using computing code stored on a persistent storage that when executed by a processor of the network device (10) performs the functionality of the message buses (104). The processor may be a hardware processor including circuitry such as, for example, a central processing unit or a microcontroller. The processor may be other types of hardware devices for processing digital information without departing from the embodiments disclosed herein.

In one or more embodiments disclosed herein, the message buses (104) provide state information distribution services. Providing state information distribution services may include (i) identifying portions of state information (e.g., 112) that may be of interest to one or more entities, (ii) identifying specific entities that are interested in the obtained state information, and (iii) providing updates to the identified specific entities regarding the portions of the state information. For example, a message bus may identify state information associated with a first agent that is of interest to the second agent and provide the second agent with a copy of the state information.

The updates provided by the message buses (104) may include differential state information. Differential state information may reflect a change to the state of an entity (e.g., an agent) at a particular point in time (or over a particular period of time).

In one or more embodiments disclosed herein, when an entity is identified as desiring access to state information associated with another entity, the system may automatically initiate a sync for the identified update. A sync may be a process through which copies of updates to the state of the other entity that have been previously sent (i.e., prior to when the identity is identified) are provided to the identified entity. By doing so, the newly identified entity may reconstruct the current state of the other entity because each of the updates previously sent may, when used in combination, enable the current state of the other entity to be reconstructed. For example, the previously sent updates may only include differential state information (e.g., changes to a state of the other entity relative to a previous state) rather than absolute state information (i.e., the state of the other entity at a point in time).

To provide state information distribution services, the message buses (104) may maintain subscription information (114) that specifies which agents are interested in different portions of the state information (112). To maintain the subscription information, the message buses (104) may (i) obtain messages or other indications reflecting the state information interests of the agents (102) and/or other entities and store such information as part of the subscription information (114).

The other indications reflecting the state information interests of the agents (102) may include, for example, termination of operable connections between message buses and the entities. For example, when an entity terminates a connection with a message bus, the message bus may infer that the termination of the connection indicates that the entity is no longer interested in receiving state information regarding one or more entities. In response to making such an inference, the message bus may modify the contents of the subscription information (114) to indicate that the entity no longer desires to receive state information for the one or more entities.

The message buses (104) may distribute state information to other entities when prompted to do so by the agent that generated the state information and/or other entities. For example, when an agent updates a portion of the state information (e.g., 112) stored in storage (110), the agent may send a message to a message bus that provides state information distribution services for the agent. The aforementioned message may prompt the message bus to distribute state information (e.g., a portion of differential state information corresponding to the update) to entities that have subscribed (e.g., as specified in the subscription information (114) to receive state information regarding the agent. By doing so, the entities that have subscribed to receive the state information regarding the agent may be made aware of the change in the state of the agent. For additional details regarding subscription information (114), refer to FIG. 1.4.

In one or more embodiments disclosed herein, the network data unit processor (106) is implemented using a hardware device including circuitry. The network data unit processor (106) may include, for example, a digital signal processor, a field programmable gate array, and/or an application specific integrated circuit. The circuitry of the aforementioned devices may be adapted to provide the functionality of the network data unit processor (106). The network data unit processor (106) may be implemented using other types of hardware devices without departing from the embodiments disclosed herein.

In one or more embodiments disclosed herein, the network data unit processor (106) is implemented using computing code stored on a persistent storage that when executed by a processor performs the functionality of the network data unit processor (106). The processor may be a hardware processor including circuitry such as, for example, a central processing unit or a microcontroller. The processor may be other types of hardware devices for processing digital information without departing from the embodiments disclosed herein.

In one or more embodiments disclosed herein, the network data unit processor (106) provides network data unit processing services. Providing network data unit services may include (i) determining whether a network data unit should be forwarded, (ii) determining a method for forwarding a network data unit that should be forwarded based on information included in forwarding information (not shown), and/or (iii) forwarding the network data unit in accordance with the determined method for forwarding a network data unit. Determining the method for forwarding the network data unit may include, for example, identifying an egress port, encapsulating information, and/or other actions to be performed to forward the network data unit.

To provide the aforementioned functionality, the network data unit processor (106) may rely on the agents (102) to (i) provide information (e.g., data structures stored in the storage (110) that are not illustrated in FIG. 1.2) that the network data unit processor (106) may use to forward network data units, (ii) manage the operation of the network device (10), and/or (iii) provide computer implemented services which the network data unit processor (106) utilizes.

In one or more embodiments disclosed herein, the storage (110) is implemented using devices that provide data storage services (e.g., storing data and providing copies of previously stored data). The devices that provide data storage services may include hardware devices and/or logical devices. For example, the storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the storage (110) may include a memory device (e.g., a dual in line memory device) in which data is stored and from which copies of previously stored data are provided. In another example, the storage (110) may include a persistent storage device (e.g., a solid-state disk drive) in which data is stored and from which copies of previously stored data is provided. In a still further example, the storage (110) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The storage (110) may store data structures including state information (112) and subscription information (114). Each of these data structures is discussed below.

The state information (112) may be a distributed data structure. In other words, the state information (112) may include any number of separate state information chunks (e.g., 112.2, 112.4). The state information (112) may include information regarding the state of agents (102) and/or other entities hosted by the network device (10).

Each of the state information chunks (e.g., 112.2, 112.4) may include state information associated with a corresponding entity. Each of the state information chunks may only include state information regarding the corresponding entity. For example, a first state information chunk may include state information regarding the state of a first agent while a second state information chunk may include state information regarding the state of a second agent. The state information (112) may include any number of state information chunks associated with any number of corresponding entities (e.g., the agents (102)).

Each of the state information chunks may be managed exclusively by corresponding entities. To be exclusively managed, each of the state information chunks may only be editable by an entity for which the respective state information chunk stores state information. For example, a state information chunk that includes state information of a first agent may only be edited (e.g., deleted, modified) by the first agent. By managing each state information chunk exclusively by corresponding entities, embodiments disclosed herein may provide a method for distributing management responsibilities for state information across the distributed system. Consequently, a failure of any entity with respect to state information may not degrade the ability of the system to manage state information throughout the system.

For additional information regarding state information chunks, refer to FIG. 1.3.

The subscription information (114) may be a data structure that includes information regarding which entities are interested in the states of other entities. For example, the subscription information (114) may specify the entities that desire to be notified of changes to the state of a particular agent. In other words, the subscription information (114) may specify, for each entity for which state information (112) is stored in the storage (110), which entities desire to be notified of changes to the state of the respective entities.

The subscription information (114) may be implemented as a table that associates entities that desire state information with corresponding entities. For example, the table may use identifiers of entities that are keyed to identifiers of other entities that desire to obtain state information from the keyed entities. The subscription information (114) may be implemented using other types of data structures (e.g., lists, linked lists, etc.) without departing from the embodiments disclosed herein. For additional details regarding subscription information (114), refer to FIG. 1.4.

While the data structures stored in the storage (110) have been described as including a limited amount of specific information, any of the data structures stored in the storage (110) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Additionally, while the network device (10) has been illustrated as including a limited number of specific components, a network device (10) in accordance with embodiments disclosed herein may include fewer, different, and/or additional components.

As discussed above, the network device (10) of FIG. 1.2 may maintain state information (112) that includes state information chunks. FIG. 1.3 shows a diagram of a state information chunk in accordance with embodiments disclosed here. As discussed above, a state information chunk may be a data structure that includes information regarding the state of a corresponding entity (e.g., an agent).

To store state information, the state information chunk (e.g., 112.2) may include any number of portions (e.g., 120, 122). Each of the portions (e.g., 120, 122) may include information reflecting a corresponding portion of the state of an associated entity.

For example, the state of an entity may be multidimensional in nature. Each dimension of the state may, in totality with the other dimensions of the state, indicate the past, current, and/or future behavior of the entity. The state information chunk may include a number of portions corresponding to the number of dimensions of the state of the corresponding entity.

Each portion (e.g., 120, 122) of the state information chunk may include any number of updates that have been made to the portion over time. In other words, rather than modifying the data of the portion reflecting a dimension of the state of a corresponding entity, a new update portion (e.g., 120.2, 120.4, 122.2, 122.4) may be added to the portion. By doing so, a history of changes in the state of an entity may be recorded for future use.

While not illustrated in FIG. 1.3, each state information chunk (e.g., 112.2) may include ordering information that specifies an ordering of each of the updates made to each of the portions. The ordering information may be, for example, a relative ordering (e.g., a first update was stored before a second update in a portion) between the updates (e.g., 120.2, 120.4). The ordering may reflect the ordering in which the updates were added to a portion over time.

The ordering information may also (or alternatively) associate the updates with different points in time. For example, each of the updates may be associated with points in time at which the updates were added to the respective portions. By including such information, the order in which of the portions were added to a state information chunk may be determined. As will be discussed below, such information may be used when a state reconstruction request is processed to ensure that the updates are processed in an order reflecting the order in which the updates were added to the state information. The aforementioned order may correspond to the order, over time, in which changes to the state of a corresponding entity were made to the entity.

While the state information chunk A (112.2) has been described as including a limited amount of specific information, a state information chunk in accordance with embodiments disclosed herein may include additional, less, and/or different information without departing from the embodiments disclosed herein. Further, the aforementioned state information chunk may be combined with other data, subdivided into any number of data structures, may be stored in other locations (e.g., in a storage hosted by another device), and/or spanned across any number devices without departing from the embodiments disclosed herein.

As discussed above, the network device (10) of FIG. 1.2 may maintain subscription information (114). FIG. 1.4 shows a diagram of subscription information in accordance with embodiments disclosed herein. As discussed above, subscription information may be a data structure that includes information regarding entities that desire access to state information associated with other entities.

To store the information regarding entities that desire access to state information associated with other entities, the subscription information (114) may include any number of entity subscribers (e.g., 130, 132). An entity subscriber may be a portion of the subscription information (114) that is associated with an entity. The entity subscriber may specify (i) the entities that desire access to state information for the associated entity and (ii) the type of information regarding the state of the associated entity that is desired by the entities.

For example, an entity subscriber (e.g., 130) may include an update subscribers list (130.2) and a reconstruction subscribers list (130.4). The update subscribers list (130.2) may specify the entities that desire to receive state information regarding changes in the state of the associated entity. The reconstruction subscribers list (130.4) may specify the entities that desire to receive information that may be used to reconstruct the state of the associated entity. The aforementioned lists may be used by message buses to determine to which entities to send state information regarding an associated entity.

Each of the entity subscribers (e.g., 130, 132) may include similar, different, and/or additional lists without departing from embodiments disclosed herein. For example, a first entity subscriber may include only an update subscribers list while a second entity subscriber may only include a reconstruction list. The number, type, and quantity of lists included in each of the entity subscribers may depend on how and to what extent other entities are interested in the state information of the respective associated entities.

While the subscription information (114) has been described as including a limited amount of specific information, subscription information in accordance with embodiments disclosed herein may include additional, less, and/or different information without departing from the embodiments disclosed herein. Further, the aforementioned state information may be combined with other data, subdivided into any number of data structures, may be stored in other locations (e.g., in a storage hosted by another device), and/or spanned across any number devices without departing from the embodiments disclosed herein.

To further clarify aspects of embodiments disclosed herein, a relationship diagram that illustrates relationships that may be present in the system of FIG. 1.1 is illustrated in FIG. 1.5. Specifically, the relationship diagram illustrates three separate relationships.

The first relationship illustrated in FIG. 1.5, as seen in the top portion of the diagram, shows a relationship between a message bus instance (e.g., 140) and entities (e.g., 142, 144) that desire access to state information of an entity for which the message bus instance (e.g., 140) provides state information distribution services. As seen from the diagram, the message bus instance may provide state information to any number of entities (e.g., entity A (142) to entity N (144)). In other words, the message bus instance may multicast or otherwise distribute state information to any number of entities to notify the entities of changes to the state of the entity for which the message bus instance provides state information distribution services.

The second relationship illustrated in FIG. 1.5, as seen in the middle portion of the diagram, shows a second relationship between an entity (e.g., 142) and any number of message bus instances (e.g., 140, 146). As seen from the diagram, the entity (e.g., 142) may obtain state information distribution services from any number of message bus instances (e.g., message bus instance A (140), message bus instance N (146)). By doing so, the entity (e.g., 142) may obtain state information for any number of entities for which the message bus instances (e.g., 140, 146), respectively, provide state information distribution services.

The third relationship illustrated in FIG. 1.5, as seen in the bottom portion of the diagram, shows a third relationship between a message bus instance (e.g., 140) and any number of operable connections to an entity (e.g., 152, 154). As seen from the diagram, a message bus instance (e.g., 140) may be operably connected to an entity by any number of operable connections (e.g., operable connection A to entity A (152), operable connection N to entity A (154)). The message bus instance (e.g., 140) may monitor the operable connections to ascertain whether the corresponding entity (e.g., entity A) desires access to state information provided by the message bus instance A (140) and/or other state information provided by other message bus instances.

As discussed above, message buses (e.g., 104, FIG. 1.2) may distribute state information to entities that desire to receive state information. To do so, the message buses may maintain subscription information and use the subscription information to determine to which entities to send state information. FIGS. 2.1-2.3 show diagrams of methods that may be performed by a message bus in accordance with one or more embodiment disclosed herein when distributing state information.

FIG. 2.1 shows a flowchart describing a method for distributing state information when a state information chunk is updated in accordance with one or more embodiments disclosed herein. The method may be performed by, for example, a message bus (e.g., 104, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 200, an update that is added to a state information chunk that is associated with a first agent is identified.

In one or more embodiments disclosed herein, the update is added to the state information chunk by the first agent. For example, when the state of the first agent changes, the first agent may add information to a state information chunk associated with the first agent as the update. The update may reflect the change to the state of the first agent.

For example, the update may include changes to configuration information of the first agent. In another example, the update may include changes to a data structure which the first agent manages. The data structure may be utilized by any number of entities. The update may include different types of information without departing from embodiments disclosed herein.

In one or more embodiments disclosed herein, identification of the update is prompted by the first agent. For example, the first agent may notify a message bus assigned to distribute state information from the first agent that the state of the first agent has changed.

In one or more embodiments disclosed herein, the update is identified using ordering information. As discussed with respect to FIG. 1.3, ordering information may be available and the ordering information may indicate which portions of a state information chunk have been added. For example, the ordering information may be used to discriminate new updates from other updates that already have been distributed by enabling the most recently added update to be identified, the second most recently added update to be identified, etc.

In one or more embodiments disclosed herein, the message bus maintains information regarding the portions of the state information chunk that have been previously distributed to subscribed entities. By doing so, the message bus may utilize the information regarding the distributed portions to discriminate the other portions of the state information chunk that have not yet been distributed. When used in combination with the ordering information, the message bus may identify the most recent but not yet distributed updates and sequentially distribute the updates that have not yet been distributed in the order that the updates were added to the state information chunk.

In Step 202, at least two agents that are subscribed to the state information chunk are identified.

In one or more embodiments disclosed herein, the at least two agents are identified using subscription information (e.g., 114, FIG. 1.2). As discussed above, the subscription information may associate entities that are subscribed to each entity. An identity of the first agent may be used as a key to identify the at least two agents.

Additionally, as discussed above, the subscription information may specify two groups of entities that are interested in obtaining state information for a particular entity. The first of the two groups may desire to be provided updates to the state of the particular entity. The second of the two groups may desire to be provided information (e.g., all updates) that enables the state of the particular entity to be reconstructed. Some entities may be members of both groups. In step 202, the message bus may use the members of the first of the two groups as the at least one second agent.

In Step 204, an action set, based on the update, is performed to provide state information based on the update to the at least two agents.

In one or more embodiments disclosed herein, the at least one action set includes sending a copy of the update to each of the at least two agents. The copy may be sent using multicast distribution of a message that includes the copy of the update.

For example, the message bus may provide a point to multipoint delivery service. The point to multipoint delivery service may facilitate transmission of data units (e.g., application-layer frames) over a transport protocol (e.g., transmission control protocol). Any entities (e.g., the second agent) that desire to receive state information regarding the first agent may open a connection to the message bus prior to receiving the state information. By doing so, the message bus may broadcast or otherwise distribute the state information using the open connections to the entities.

The method may end following Step 204.

By distributing state information, as illustrated in FIG. 2.1, embodiments disclosed herein may enable any number of entities to be notified of changes to the states of other entities.

The method illustrated in FIG. 2.1 may be performed any number of times and at different points in time. As discussed above, the entities included in the different groups of the subscription information may change over time. Consequently, upon each performance of the method of FIG. 2.1, the agents to which the updates are provided may change with respect to the different points in time.

For example, when the method of FIG. 2.1 is performed at a first point in time, the state information may be provided to a first and a second agent. After the first point in time, the subscription information may be updated to indicate that the second agent is no longer interested in state information. Consequently, when the method of FIG. 2.1 is performed a second time only one of the two agents may be provided with state information because the subscription information used in step 202 no longer indicates that the second agent is interested in obtaining the state information.

When distributing state information, as noted above, message buses may maintain subscription information by adding or removing entities as being interested in the states of various entities. FIGS. 2.2-2.3 show methods that may be used to maintain state information.

FIG. 2.2 shows a flowchart describing a first method for maintaining state information in accordance with one or more embodiments disclosed herein. The method may be performed by, for example, a message bus (e.g., 104, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time.

In Step 210, a closing of an operable connection between a message bus and an entity is identified.

The connection may have been used by the message bus, prior to the closing of the connection, to distribute state information to or receive state information from the entity. For example, the message bus may have been responsible for distributing state information to the entity and other entities. To do so, the message bus may have multi-casted the state information using the operable connection and other operable connections between the message bus and the other entities.

The message bus may identify the closing by monitoring the operable connections between the message bus and entity to which the message bus is distributing state information.

In Step 212, it is determined whether the entity subscribed to any other entity.

In one or more embodiments disclosed herein, the determination may be made by comparing an identity of the entity to entity subscribers (e.g., 130, 132, FIG. 1.4). As discussed above, each entity subscriber may specify one or more lists of entities that are subscribed to an entity corresponding to the entity subscribers. If the identity of the entity does not match the identity of any entity in any list of any of the entity subscribers, the message bus may determine that the entity is not subscribed to any other entity.

In some embodiments disclosed herein, the message bus may maintain a hash list of all of the identities of all of the entities that have subscribed to another entity. To make the determination, the message bus may generate a hash of the identity of the entity and check the hash list to determine whether the generated hash matches any hash in the list. If the hash doesn't match any hash in the hash list, the message bus may determine that the entity is not subscribed to any entity.

If it is determined that the entity is subscribed to any entity, the method may proceed to Step 214. If it is determined that the entity is not subscribed to any entity, the method may end following Step 212.

In Step 214, an action set is performed to prevent attempts to distribute future state information to the entity.

In one or more embodiments disclosed herein, the action set includes removing the entity from all lists of entity subscribers associated with an entity for which the message bus provides state information distribution services.

In one or more embodiments disclosed herein, the action set includes removing the entity from all lists of all entity subscribers.

By removing the entity from the lists of one or more entity subscribers, the message bus and/or other message buses may no longer consider the entity to be subscribed (for state information distribution purposes) to the entity and/or all other entities. Consequently, the message bus and/or other message busses may not attempt to send state information including updates to the entity.

The method may end following Step 214.

Using the method illustrated in FIG. 2.2, a system in accordance with embodiments disclosed herein may automatically infer when entities no longer desire access to state information associated with a particular entity. By doing so, the system may reduce the computational cost of distributing state information without consuming additional computational resources obtaining state information preferences from the entities directly.

FIG. 2.3 shows a flowchart describing a second method for maintaining state information in accordance with one or more embodiments disclosed herein. The method may be performed by, for example, a message bus (e.g., 104, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time.

In Step 220, a subscription update request is obtained.

In one or more embodiments disclosed herein, the subscription update request is obtained from an agent or another type of entity. The subscription update request may specify a modification of a subscription or a request for a new subscription. For example, the subscription update request may be a request to provide an entity with state information regarding another entity in the future. In another example, the subscription update request may be a request to no longer provide an entity with state information regarding another entity in the future. The state update request may specify other types of modifications to a subscription.

In one or more embodiments disclosed herein, the subscription update may be obtained using an operable connection between the entity that generated the subscription update request and a message bus processing the subscription update request. The operable connection may, or may not, be used by the message bus to multicast state information to the entity that generated the subscription request.

Additionally, the subscription update request may specify a modification of a subscription that is unrelated to the entity that provided the subscription update request to the message bus. In other words, an entity may modify a subscription of another entity by sending a subscription update request.

In Step 222, a subscription update is determined based on the subscription request. The subscription update may be a data structure that includes information regarding modifications to be made to subscription information. The subscription update may include, for example, (i) a type of a subscription (e.g., state updates, state reconstruction, etc.), (ii) an identity of an entity that desires a change in subscription preferences (i.e., an entity that is subscribing or unsubscribing), and/or (iii) a subscription target (i.e., the entity for which state information is desired). The subscription update request may specify all, or a portion, of the information included in the subscription update.

In Step 224, the subscription update is applied to the subscription information. The subscription update may be applied to the subscription information by conforming the content of the subscription information to match the content of the subscription update. For example, information regarding a subscription may be add to or removed from the subscription information to apply the subscription update to the subscription information.

The method may end following Step 224.

Using the method illustrated in FIG. 2.3, a system in accordance with embodiments disclosed herein may enable entities to modify subscription preferences by sending requests for modifications to message buses.

As discussed above, embodiments disclosed herein may be implemented using a network device. In one or more embodiments, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 10, FIG. 1.1) include, but are not limited to, a network switch, a router, a multilayer switch, a fiber channel device, an InfiniBand® device, etc. A network device (e.g., 10, FIG. 1.1) is not limited to the aforementioned specific examples.

In one or more embodiments, a network device (e.g., 10, FIG. 1.1) includes functionality to receive network data units (e.g., frames, packets, tunneling protocol frames, etc.) at any of the physical network interfaces (i.e., ports) of the network device (e.g., 10, FIG. 1.1) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (e.g., 10, FIG. 1.1).

In one or more embodiments, a network device (e.g., 10, FIG. 1.1) also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors) of a network device (e.g., 10, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 10, FIG. 1.1) is part of a network (e.g., 10, 20, 30, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (e.g., 10, FIG. 1.1)) that facilitate network connectivity for one or more operatively connected devices (e.g., computing devices, data storage devices, other network devices, etc.). In one or more embodiments, the network device (e.g., 10, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 3.1-3.3. FIG. 3.1 may illustrate a system similar to that illustrated in FIG. 1.1. FIGS. 3.2-3.3 may illustrate interactions between components of the system of FIG. 3.1 over time. For the sake of brevity, only a limited number of components of the system of FIG. 1.1 are illustrated in each of FIGS. 3.1-3.3.

Example

Consider a scenario as illustrated in FIG. 3.1 in which a network device (300) is providing network data unit forwarding services to other entities (not shown). To provide the network data forwarding services, the network device (300) includes a network data unit processor (305) that utilizes forwarding information (not shown) to decide how (e.g., encapsulation, egress port, etc.) to forward network data units.

The network device (300) may also include three agents (e.g., 301, 302, 303). The agents may provide services used by the network data unit processor (305) and/or other entities not illustrated in FIG. 3.1. Some of the agents may utilize the states of the other agents during different portions of their operation.

To provide state information to the three agents, the network device (300) includes a message bus (306) that provides state information distribution services. When providing the state information distribution services, the message bus (306) may maintain subscription information (309) stored in storage (308) of the network device (300).

Turning to FIGS. 3.2-3.3, the aforementioned figures illustrate interactions between select components of the system of FIG. 3.1. In these figures, the relative occurrence in time of the interactions progresses from the top of each figure (i.e., earlier in time) to the bottom of each figure (i.e., later in time). FIG. 3.3 is a continuation of the diagram of FIG. 3.2. In other words, element 310 indicates the first interaction that occurs while element 342 indicates the last interaction that occurs.

Returning to FIG. 3.2, at a first point in time, the first agent (301) determines that it needs to obtain state information from the third agent (303). To do so, the first agent opens a connection (310) to the message bus (306). After opening the connection, the first agent (301) sends a subscription request (312) to the message bus to indicate that the first agent (301) desires access to updates to the state of the third agent (303).

In response to receiving the subscription request (312), the message bus (306) sends a subscription update (314) to the storage (308) to update the subscription information to indicate that the first agent (301) desires access to state information regarding the third agent (303).

After the message bus (306) updates the subscription information, the state of the third agent (303) changes. In response to the change in its state, the third agent (303) sends a state update (316) to the storage (308) to update a state information chunk (not shown) that includes state information regarding the third agent (303). The update adds information reflecting the change in the state of the third agent (303) to the state information chunk.

After sending the state update (316), the third agent (303) sends a state change notification (318) to the message bus (306). In response to receiving the state change notification (318), the message bus (306) identifies that the first agent (301) desires access to state information associated with the third agent using the state information chunk, obtains information reflecting the state update (316) from the storage (308), and sends a state update (320) to the first agent (301) based on the identification. The state update (320) includes information regarding the change in state of the third agent. By doing so, the first agent (301) is made aware of the change in state of the third agent (303).

After the first agent (301) receives the state update (320), the second agent (302) determines that it needs to obtain state information from the third agent (303). To do so, the second agent (302) opens a connection (322) to the message bus (306). After opening the connection (322), the second agent (302) sends a subscription request (324) to the message bus (306) to indicate that the second agent (302) desires access to updates to the state of the third agent (303).

In response to receiving the subscription request (324), the message bus (306) sends a subscription update (326) to the storage (308) to update the subscription information to indicate that the second agent (302) desires access to state information regarding the third agent (303). At this point, the subscription information indicates that both the first agent (301) and the second agent (302) desire access to state information regarding the third agent (303).

After the message bus (306) updates the subscription information, the state of the third agent (303) changes. In response to the change in its state, the third agent (303) sends a state update (328) to the storage (308) to update the state information chunk (not shown) that includes the state information regarding the third agent (303). The update adds information reflecting the change in the state of the third agent (303) to the state information chunk.

After sending the state update (328), the third agent (303) sends a state change notification (330) to the message bus (306). In response to receiving the state change notification (330), the message bus (306) identifies that the first agent (301) and the second agent (302) desire access to state information associated with the third agent using the state information chunk, obtains information reflecting the state update (328) from the storage (308), and multicasts a state update (320) to the first agent (301) and the second agent (302) based on the identification. The state update (332) includes information regarding the change in state of the third agent (303). By doing so, the first agent (301) is made aware of the change in state of the third agent (303).

After the first agent (301) and the second agent (302) receive the state update (332), the first agent (301) determines that it no longer needs to obtain state information from the third agent (303). In response to the determination, the first agent (301) closes the connection (334) to the message bus (306), as indicated by the dashed line having a break in it between the third agent and the message bus.

After the connection (334) is closed, the message bus (306) infers, based on the closed connection, that the first agent (301) does not desire access to state information regarding the third agent (303). In response to determining that the first agent (301) does not desire access to state information, the message bus (306) sends a subscription update (336) to the storage (308) to update the subscription information to indicate that the first agent (301) does not desires access to state information regarding the third agent (303). At this point, the subscription information indicates that only the second agent (302) desire access to state information regarding the third agent (303).

After the message bus (306) updates the subscription information, the state of the third agent (303) changes. In response to the change in its state, the third agent (303) sends a state update (338) to the storage (308) to update a state information chunk (not shown) that includes state information regarding the third agent (303). The update adds information reflecting the change in the state of the third agent (303) to the state information chunk.

After sending the state update (338), the third agent (303) sends a state change notification (340) to the message bus (306). In response to receiving the state change notification (340), the message bus (306) identifies that the second agent (302) desires access to state information associated with the third agent using the state information chunk, obtains information reflecting the state update (316) from the storage (308), and sends a state update (342) to the second agent (302) based on the identification. The state update (338) includes information regarding the change in state of the third agent. By doing so, the second agent (302) is made aware of the change in state of the third agent (303).

End of Example

As discussed above, embodiments disclosed herein may be implemented using computing devices. FIG. 4 shows a diagram of a computing device in accordance with one or more embodiments disclosed herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment disclosed herein, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments disclosed herein may provide a network device and/or method that enables state information to be distributed to any number of entities. To do so, the system may maintain subscription information that indicates the entities that desire access to state information regarding respective entities. To maintain the subscription information, the system may (i) modify the contents of the subscription information based on information received from the entities and (ii) modify the contents of the subscription information based on the behaviors of the entities. By doing, the system may provide a method for distributing state information that is computationally efficient. For example, by inferring which entities desire state information based on the behaviors of the entities, embodiments disclosed herein may avoid the computational overhead of requesting, obtaining, and processing information from the entities that directly indicates their respective desires for being provided state information.

Thus, embodiments disclosed herein may address the problem of limited computational resource availability by reducing the computational cost for distributing state information. While embodiments have been described as addressing one or more specific challenges relating to network environments (e.g., limited computational resources), embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
   a storage storing subscription information; and
   a message bus, distinct from a first agent, programmed to:
   distribute state information regarding the first agent to at least two agents based on the subscription information, wherein the state information is stored in a data structure exclusively managed by the first agent;
   after distributing the state information, make a determination that a connection to one of the at least two agents has been closed; and
   perform, based on the determination, an action set to prevent attempts to distribute future state information to the one of the at least two agents.

2. The network device of claim 1, wherein the action set comprises:
   updating the subscription information to indicate that the one of the at least two agents is not subscribed to receive state information regarding the first agent.

3. The network device of claim 2, wherein distributing the state information associated with the first agent to the at least two agents based on the subscription information comprises:
   determining an identity of the first agent;
   matching the identity to a subscription list of the subscription information; and
   multicasting the state information to each member of the subscription list.

4. The network device of claim 1, wherein the subscription information indicates that the at least two agents are subscribed to state updates associated with the first agent.

5. The network device of claim 1, wherein the message bus is further programmed to:
   prior to distributing the state information:
   make a second determination that the one of the at least two agents opened the connection to the message bus; and
   in response to the second determination, update the subscription information to indicate that the one of the at least two agents is subscribed to the first agent.

6. The network device of claim 1, wherein the message bus is further programmed to:
   receive a subscription request, via the connection, from the one of the at least two agents for a second agent; and
   in response to receiving the subscription request, update the subscription information to indicate that the one of the at least two agents is subscribed to the second agent.

7. The network device of claim 6, wherein the action set comprises:
   updating the subscription information to indicate that the one of the at least two agents is not subscribed to:
   the first agent, and
   the second agent.

8. The network device of claim 1, wherein the state information is not accessible by the message bus after distributing the state information.

9. The network device of claim 1, wherein the message bus is further programmed to:
   receive a subscription removal request, via the connection, from the one of the at least two agents for a second agent; and
   in response receiving the subscription removal request, update the subscription information to indicate that the one of the at least two agents is not subscribed to the second agent.

10. The network device of claim 1, wherein the data structure only includes information regarding the first agent.

11. A method, comprising:
    distributing, via a message bus, state information regarding a first agent, distinct from the message bus, to at least two agents based on subscription information, wherein the state information is stored in a data structure exclusively managed by the first agent;
    after distributing the state information, making a determination that a connection to one of the at least two agents has been closed; and
    performing, based on the determination, an action set to prevent attempts to distribute future state information to the one of the at least two agents.

12. The method of claim 11, wherein the action set comprises:
    updating the subscription information to indicate that the one of the at least two agents is not subscribed to receive state information regarding the first agent.

13. The method of claim 12, wherein distributing the state information associated with the first agent to the at least two agents based on the subscription information comprises:
    determining an identity of the first agent;
    matching the identity to a subscription list of the subscription information; and
    multicasting the state information to each member of the subscription list.

14. The method of claim 11, wherein the subscription information indicates that the at least two agents are subscribed to state updates associated with the first agent.

15. The method of claim 11, further comprising:
    prior to distributing the state information:
    making a second determination that the one of the at least two agents opened the connection to the message bus; and
    in response to the second determination, updating the subscription information to indicate that the one of the at least two agents is subscribed to the first agent.

16. A non-transitory computer readable medium comprising computer readable program code, which when executed by a computer processor enables the computer processor to perform a method, the method comprising:
    distributing, via a message bus, state information regarding a first agent, distinct from the message bus, to at least two agents based on subscription information, wherein the state information is stored in a data structure exclusively managed by the first agent;
    after distributing the state information, determining that a connection to one of the at least two agents has been closed; and
    performing, based on the determination, an action set to prevent attempts to distribute future state information to the one of the at least two agents.

17. The non-transitory computer readable medium of claim 16, wherein the action set comprises:

updating the subscription information to indicate that the one of the at least two agents is not subscribed to receive state information regarding the first agent.

18. The non-transitory computer readable medium of claim 17, wherein distributing the state information associated with the first agent to the at least two agents based on the subscription information comprises:

determining an identity of the first agent;

matching the identity to a subscription list of the subscription information; and multicasting the state information to each member of the subscription list.

19. The non-transitory computer readable medium of claim 16, wherein the subscription information indicates that the at least two agents are subscribed to state updates associated with the first agent.

20. The non-transitory computer readable medium of claim 16, wherein the method further includes:

prior to distributing the state information:

making a second determination that the one of the at least two agents opened the connection to the message bus; and in response to the second determination, updating the subscription information to indicate that the one of the at least two agents is subscribed to the first agent.

\* \* \* \* \*